(12) United States Patent
Rosenberg et al.

(10) Patent No.: US 10,180,746 B1
(45) Date of Patent: Jan. 15, 2019

(54) HARDWARE ENABLED INTERPOLATING SENSOR AND DISPLAY

(75) Inventors: Ilya D. Rosenberg, Mountain View, CA (US); Julien G. Beguin, San Francisco, CA (US); Kenneth H. Perlin, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 1692 days.

(21) Appl. No.: 12/846,428

(22) Filed: Jul. 29, 2010

Related U.S. Application Data (63) Continuation-in-part of application No. 12/380,350, filed on Feb. 26, 2009.
(60) Provisional application No. 61/230,592, filed on Jul. 31, 2009.

(51) Int. Cl.
*G06F 3/041* (2006.01)
*G06F 3/045* (2006.01)

(52) U.S. Cl.
CPC ............ *G06F 3/0414* (2013.01); *G06F 3/041* (2013.01); *G06F 3/045* (2013.01); *G06F 3/0416* (2013.01)

(58) Field of Classification Search
CPC ........ G06F 3/041; G06F 3/045; G06F 3/0414; G06F 3/0416
USPC ............ 345/156–184, 104; 178/18.01–20.04
See application file for complete search history.

(56) References Cited

U.S. PATENT DOCUMENTS

| | | | |
|---|---|---|---|
| 3,944,740 A | | 3/1976 | Murase et al. |
| 4,526,043 A | * | 7/1985 | Boie et al. ............... 73/862.046 |
| 4,587,378 A | | 5/1986 | Moore |
| 4,952,031 A | * | 8/1990 | Tsunoda et al. ................. 349/24 |
| 4,983,786 A | * | 1/1991 | Stevens et al. ............ 178/18.01 |
| 5,105,548 A | | 4/1992 | Fowler |
| 5,543,589 A | * | 8/1996 | Buchana et al. ........... 178/18.03 |
| 5,597,183 A | | 1/1997 | Johnson |
| 5,666,113 A | | 9/1997 | Logan |
| 5,761,485 A | | 6/1998 | Munyan |

(Continued)

FOREIGN PATENT DOCUMENTS

| | | |
|---|---|---|
| JP | 09282100 | 10/2007 |
| WO | WO2007/141566 A2 | 12/2007 |

(Continued)

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

(Continued)

*Primary Examiner* — Patrick F Marinelli
(74) *Attorney, Agent, or Firm* — Lee & Hayes, P.C.

(57) ABSTRACT

A hardware enabled interpolating sensor allows for anti-aliased acquisition of data. Electrodes coupled with resistive material are disposed on either side of a transducer material, such that an impinging signal varies the electrical characteristics of the transducer material. A controller scans the electrodes and analyzes the variation in the electrical characteristics to generate data. Based upon the known characteristics of the resistive material, an interpolated image is generated from the data which is inherently anti-aliased. Additionally, an interpolating display comprising electrodes disposed on either side of an emission material is described, which allows for emission regions of varying intensity, area, and so forth.

13 Claims, 10 Drawing Sheets

(56) References Cited

U.S. PATENT DOCUMENTS

| | | | |
|---|---|---|---|
| 5,818,430 A | 10/1998 | Heiser | |
| 5,825,352 A | 10/1998 | Bisset et al. | |
| 5,847,698 A | 12/1998 | Reavey et al. | |
| 6,029,214 A | 2/2000 | Dorfman et al. | |
| 6,072,474 A | 6/2000 | Morimura et al. | |
| 6,128,007 A | 10/2000 | Seybold | |
| 6,229,502 B1 | 5/2001 | Schwab | |
| 6,392,636 B1 | 5/2002 | Ferrari et al. | |
| 6,594,606 B2* | 7/2003 | Everitt | 702/107 |
| 6,707,438 B1* | 3/2004 | Ishizuka et al. | 345/78 |
| 6,762,752 B2 | 7/2004 | Perski et al. | |
| 6,980,202 B2 | 12/2005 | Carro | |
| 6,982,699 B1 | 1/2006 | Lenssen et al. | |
| 7,123,243 B2 | 10/2006 | Kawasaki et al. | |
| 7,166,966 B2* | 1/2007 | Naugler et al. | 315/149 |
| 7,190,348 B2 | 3/2007 | Kennedy et al. | |
| 7,199,322 B2 | 4/2007 | Bourdelais et al. | |
| 7,324,093 B1 | 1/2008 | Gettemy et al. | |
| 7,331,245 B2 | 2/2008 | Nishimura et al. | |
| 7,339,577 B2 | 3/2008 | Sato et al. | |
| 7,471,284 B2 | 12/2008 | Bathiche et al. | |
| 7,619,616 B2 | 11/2009 | Rimas Ribikauskas et al. | |
| 7,760,187 B2 | 7/2010 | Kennedy | |
| 7,800,586 B2 | 9/2010 | Serban et al. | |
| 7,825,905 B2 | 11/2010 | Philipp | |
| 8,089,470 B1 | 1/2012 | Schediwy et al. | |
| 8,223,278 B2* | 7/2012 | Kim et al. | 349/12 |
| 8,243,424 B1 | 8/2012 | Babu et al. | |
| 8,265,717 B2 | 9/2012 | Gorsica et al. | |
| 8,316,324 B2 | 11/2012 | Boillot | |
| 8,427,424 B2 | 4/2013 | Hartmann et al. | |
| 8,466,880 B2 | 6/2013 | Westerman et al. | |
| 8,558,767 B2* | 10/2013 | Kwon | 345/77 |
| 8,902,174 B1 | 12/2014 | Peterson | |
| 8,947,351 B1 | 2/2015 | Noble | |
| 9,069,417 B2 | 6/2015 | Rimon et al. | |
| 9,244,562 B1 | 1/2016 | Rosenberg et al. | |
| 2001/0013855 A1 | 8/2001 | Fricker et al. | |
| 2002/0015024 A1 | 2/2002 | Westerman et al. | |
| 2002/0080123 A1 | 6/2002 | Kennedy et al. | |
| 2002/0109668 A1 | 8/2002 | Rosenberg et al. | |
| 2002/0149572 A1 | 10/2002 | Schulz et al. | |
| 2002/0180714 A1 | 12/2002 | Duret | |
| 2003/0067449 A1* | 4/2003 | Yoshikawa et al. | 345/173 |
| 2003/0095115 A1 | 5/2003 | Brian et al. | |
| 2003/0156098 A1 | 8/2003 | Shaw et al. | |
| 2003/0210235 A1 | 11/2003 | Roberts | |
| 2003/0234768 A1 | 12/2003 | Rekimoto et al. | |
| 2004/0125087 A1 | 7/2004 | Taylor et al. | |
| 2004/0174324 A1* | 9/2004 | Yamazaki et al. | 345/76 |
| 2005/0083316 A1 | 4/2005 | Brian et al. | |
| 2005/0162402 A1 | 7/2005 | Watanachote | |
| 2005/0174336 A1* | 8/2005 | Nakayama et al. | 345/173 |
| 2005/0200798 A1 | 9/2005 | Tanaka | |
| 2005/0259087 A1 | 11/2005 | Hoshino et al. | |
| 2006/0007172 A1 | 1/2006 | Baker et al. | |
| 2006/0007182 A1 | 1/2006 | Sato et al. | |
| 2006/0012580 A1 | 1/2006 | Perski et al. | |
| 2006/0012581 A1 | 1/2006 | Haim et al. | |
| 2006/0028459 A1 | 2/2006 | Underwood et al. | |
| 2006/0050062 A1 | 3/2006 | Ozawa et al. | |
| 2006/0097991 A1 | 5/2006 | Hotelling et al. | |
| 2006/0109252 A1 | 5/2006 | Kolmykov-Zotov et al. | |
| 2006/0192726 A1 | 8/2006 | Huitema et al. | |
| 2006/0198080 A1 | 9/2006 | Hawes et al. | |
| 2006/0209045 A1 | 9/2006 | Su et al. | |
| 2006/0236263 A1 | 10/2006 | Bathiche et al. | |
| 2006/0244735 A1 | 11/2006 | Wilson | |
| 2006/0293864 A1 | 12/2006 | Soss | |
| 2007/0128948 A1 | 6/2007 | Nakanishi et al. | |
| 2007/0152976 A1 | 7/2007 | Townsend et al. | |
| 2007/0236618 A1 | 10/2007 | Maag et al. | |
| 2007/0262246 A1 | 11/2007 | Pittel et al. | |
| 2008/0018608 A1 | 1/2008 | Serban et al. | |
| 2008/0018611 A1 | 1/2008 | Serban et al. | |
| 2008/0030464 A1 | 2/2008 | Sohm et al. | |
| 2008/0053293 A1 | 3/2008 | Georges et al. | |
| 2008/0074400 A1 | 3/2008 | Gettemy et al. | |
| 2008/0143679 A1 | 6/2008 | Harmon et al. | |
| 2008/0158183 A1 | 7/2008 | Hotelling et al. | |
| 2008/0160656 A1 | 7/2008 | Chanda et al. | |
| 2008/0168403 A1 | 7/2008 | Westerman et al. | |
| 2008/0180406 A1 | 7/2008 | Han et al. | |
| 2008/0204426 A1 | 8/2008 | Hotelling et al. | |
| 2008/0211796 A1* | 9/2008 | Kim | 345/204 |
| 2008/0246723 A1 | 10/2008 | Baumbach | |
| 2008/0254822 A1 | 10/2008 | Tilley | |
| 2008/0296073 A1 | 12/2008 | McDermid | |
| 2008/0303799 A1 | 12/2008 | Schwesig et al. | |
| 2008/0309631 A1 | 12/2008 | Westerman et al. | |
| 2009/0095540 A1 | 4/2009 | Zachut et al. | |
| 2009/0102805 A1 | 4/2009 | Meijer et al. | |
| 2009/0120696 A1 | 5/2009 | Hayakawa et al. | |
| 2009/0141008 A1 | 6/2009 | Johnson et al. | |
| 2009/0153152 A1 | 6/2009 | Maharyta et al. | |
| 2009/0165296 A1 | 7/2009 | Carmi | |
| 2009/0174679 A1 | 7/2009 | Westerman | |
| 2009/0218310 A1 | 9/2009 | Zu et al. | |
| 2009/0219258 A1 | 9/2009 | Geaghan et al. | |
| 2009/0227295 A1 | 9/2009 | Kim | |
| 2009/0237371 A1 | 9/2009 | Kim et al. | |
| 2009/0237374 A1 | 9/2009 | Li et al. | |
| 2009/0249236 A1 | 10/2009 | Westerman et al. | |
| 2009/0256817 A1 | 10/2009 | Perlin et al. | |
| 2009/0289914 A1 | 11/2009 | Cho | |
| 2009/0309616 A1 | 12/2009 | Klinghult et al. | |
| 2009/0315848 A1 | 12/2009 | Ku et al. | |
| 2010/0005427 A1 | 1/2010 | Zhang et al. | |
| 2010/0006350 A1 | 1/2010 | Elias | |
| 2010/0013780 A1 | 1/2010 | Ikeda et al. | |
| 2010/0013797 A1* | 1/2010 | Kim et al. | 345/176 |
| 2010/0020043 A1 | 1/2010 | Park et al. | |
| 2010/0026647 A1 | 2/2010 | Abe et al. | |
| 2010/0039395 A1 | 2/2010 | Nurmi et al. | |
| 2010/0056277 A1 | 3/2010 | Marks et al. | |
| 2010/0090964 A1 | 4/2010 | Soo et al. | |
| 2010/0117974 A1* | 5/2010 | Joguet et al. | 345/173 |
| 2010/0123670 A1 | 5/2010 | Philipp | |
| 2010/0139990 A1 | 6/2010 | Westerman et al. | |
| 2010/0156805 A1 | 6/2010 | Brand et al. | |
| 2010/0182285 A1 | 7/2010 | Tremblay | |
| 2010/0199221 A1 | 8/2010 | Yeung et al. | |
| 2010/0225604 A1 | 9/2010 | Homma et al. | |
| 2010/0267421 A1 | 10/2010 | Rofougaran | |
| 2010/0277439 A1 | 11/2010 | Charlier et al. | |
| 2010/0295780 A1 | 11/2010 | Vaisanen et al. | |
| 2010/0295781 A1 | 11/2010 | Alameh et al. | |
| 2010/0311356 A1* | 12/2010 | Rofougaran | H01Q 1/2283 455/91 |
| 2011/0007021 A1 | 1/2011 | Bernstein et al. | |
| 2011/0025619 A1 | 2/2011 | Joguet et al. | |
| 2011/0037709 A1 | 2/2011 | Cottarel | |
| 2011/0061947 A1 | 3/2011 | Krah et al. | |
| 2011/0074701 A1 | 3/2011 | Dickinson et al. | |
| 2011/0096033 A1 | 4/2011 | Ko | |
| 2011/0109577 A1 | 5/2011 | Lee et al. | |
| 2011/0141009 A1 | 6/2011 | Izumi | |
| 2011/0163992 A1 | 7/2011 | Cordeiro et al. | |
| 2011/0242037 A1 | 10/2011 | Gruber | |
| 2011/0254864 A1 | 10/2011 | Tsuchikawa et al. | |
| 2011/0267265 A1 | 11/2011 | Stinson | |
| 2011/0267280 A1 | 11/2011 | De Mers et al. | |
| 2011/0285657 A1 | 11/2011 | Shimotani et al. | |
| 2012/0034888 A1* | 2/2012 | De Flaviis | G06F 1/1698 455/129 |
| 2012/0050181 A1 | 3/2012 | King et al. | |
| 2012/0057064 A1 | 3/2012 | Gardiner et al. | |
| 2012/0084691 A1 | 4/2012 | Yun | |
| 2012/0105324 A1 | 5/2012 | Lee et al. | |
| 2012/0173067 A1 | 7/2012 | Szczerba et al. | |
| 2012/0174004 A1 | 7/2012 | Seder et al. | |
| 2012/0206333 A1 | 8/2012 | Kim | |
| 2012/0299648 A1 | 11/2012 | Homma et al. | |
| 2012/0299849 A1 | 11/2012 | Homma et al. | |

(56) References Cited

U.S. PATENT DOCUMENTS

| | | | |
|---|---|---|---|
| 2012/0313880 | A1 | 12/2012 | Geaghan et al. |
| 2012/0320247 | A1 | 12/2012 | Kim et al. |
| 2012/0326994 | A1 | 12/2012 | Miyazawa et al. |
| 2013/0002551 | A1 | 1/2013 | Imoto et al. |
| 2014/0028557 | A1 | 1/2014 | Otake et al. |
| 2014/0085202 | A1 | 3/2014 | Hamalainen et al. |
| 2014/0267176 | A1 | 9/2014 | Bathiche et al. |
| 2014/0285418 | A1 | 9/2014 | Adachi |
| 2015/0109257 | A1 | 4/2015 | Jalali |

FOREIGN PATENT DOCUMENTS

| | | |
|---|---|---|
| WO | WO2009/008568 A1 | 1/2009 |
| WO | WO2009/021836 A1 | 2/2009 |

OTHER PUBLICATIONS

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

Non-Final Office Action for U.S. Appl. No. 12/846,497, dated Dec. 14, 2012, Ilya D. Rosenberg et al., "Capacitive Sensing with Interpolating Force-Sensitive Resistor Array", 26 pages.

Office action for U.S. Appl. No. 12/846,328, dated Dec. 24, 2012, Rosenberg et al., "Two-Sided Touch Sensor", 15 pages.

Office action for U.S. Appl. No. 13/247,699, dated Jul. 19, 2013, Beguin et al., "Interacting Through Noncontact Gestures", 32 pages.

Office action for U.S. Appl. No. 12/846,328, dated Aug. 15, 2013, Rosenberg et al., "Two-Sided Touch Sensor", 18 pages.

Office action for U.S. Appl. No. 12/846,519, dated Apr. 24, 2013, Rosenberg et al., "Touch Sensing Techniques", 23 pages.

Office action for U.S. Appl. No. 12/846,497, dated Apr. 25, 2013, Rosenberg et al., "Capacitive Sensing with Interpolating Force-Sensitive Resistor Array", 27 pages.

Office action for U.S. Appl. No. 12/846,295, dated May 21, 2013, Rosenberg et al., "Visually Consistent Arrays", 14 pages.

Office action for U.S. Appl. No. 12/846,268, dated May 3, 2013, Rosenberg et al., "Gestures and Touches on Force-sensitive Input Devices", 15 pages.

Non-Final Office Action for U.S. Appl. No. 13/247,669, dated Feb. 1, 2013, Julien G. Beguin et al., "Interacting Through Noncontact Gestures", 22 pages.

Non-Final Office Action for U.S. Appl. No. 12/846,368, dated Feb. 15, 2013, Ilya D. Rosenberg et al., "Touch Distinction", 23 pages.

Office Action for U.S. Appl. No. 12/846,539, dated Feb. 15, 2013, Ilya D. Rosenberg et al., "Magnetic Touch Discrimination", 20 pages.

Moscovich, et al., "Multi-finger Cursor Techniques", Department of Computer Science, Brown University, Year of Publication: 2006, 7 pages.

Final Office Action for U.S. Appl. No. 12/846,539, dated Oct. 25, 2013, Ilya D. Rosenberg, "Magnetic Touch Discrimination", 26 pages.

Final Office Action for U.S. Appl. No. 12/846,295, dated Dec. 23, 2013, Ilya D. Rosenberg, "Visually Consistent Arrays including Conductive Mesh", 16 pages.

Office Action for U.S. Appl. No. 12/846,268, dated Oct. 23, 2013, Ilya D. Rosenberg, "Gestures and Touches on Force-sensitive Input Devices", 37 pages.

Office action for U.S. Appl. No. 12/846,519, dated Nov. 14, 2013, Rosenberg, et al., "Touch Sensing Techniques", 24 pages.

Office Action for U.S. Appl. No. 12/846,328, dated Dec. 19, 2013, Ilya D. Rosenberg, "Two-Sided Touch Sensor", 13 pages.

Office action for U.S. Appl. No. 12/846,368, dated Sep. 13, 2013, Rosenberg et al., "Touch Distinction", 36 pages.

Wolf, et al., "Angles, Azimuths, and Bearings", Pearson Prentice Hall, Elementary Surveying, 12th Edition, 2008, Chapter 7, pp. 165-184.

Office Action for U.S. Appl. No. 13/247,699, dated Jan. 31, 2014, Julien G. Beguin, "Interacting Through Noncontact Gestures", 28 pages.

Office Action for U.S. Appl. No. 12/846,268, dated Jul. 29, 2010, Ilya D. Rosenberg, "Gestures and Touches on Force-sensitive Input Devices", 32 pages.

Office Action for U.S. Appl. No. 12/846,497, dated Oct. 23, 2014, Ilya D. Rosenberg, "Capacitive Sensing with Interpolating Force-Sensitive Resistor Array", 25 pages.

Office action for U.S. Appl. No. 12/846,368, dated Jul. 17, 2014, Rosenberg et al., "Touch Distinction", 45 pages.

Office action for U.S. Appl. No. 12/846,295, dated Sep. 24, 2014, Rosenberg et al., "Visually Consistent Arrays including Conductive Mesh", 17 pages.

Final Office Action for U.S. Appl. No. 13/247,699, dated Sep. 26, 2014, Julien G. Beguin, "Interacting Through Noncontact Gestures", 30 pages.

Office Action for U.S. Appl. No. 12/846,539, dated Feb. 24, 2015, Ilya D. Rosenberg, "Magnetic Touch Discrimination", 17 pages.

Final Office Action for U.S. Appl. No. 12/846,368, dated Feb. 27, 2015, Ilya D. Rosenbert, "Touch Distinction", 49 pages.

Office action for U.S. Appl. No. 12/846,368, dated Oct. 18, 2016, Rosenberg et al., "Touch Distinction", 21 pages.

Office action for U.S. Appl. No. 12/846,519 dated Nov. 18, 2015, Rosenberg et al., "Touch Sensing Techniques", 36 pages.

Office action for U.S. Appl. No. 15/003,086, dated Dec. 15, 2016, Rosenberg et al., "Gestures and Touches on Force-sensitive Input Devices", 23 pages.

Office Action for U.S. Appl. No. 12/846,268, dated Dec. 22, 2014, Ilya D. Rosenberg, "Gestures and Touches on Force-sensitive Input Devices", 36 pages.

Office Action for U.S. Appl. No. 12/846,497, dated Dec. 22, 2016, Rosenberg et al., "Capacitive Sensing with Interpolating Force-Sensitive Resistor Array", 43 pages.

Office Action for U.S. Appl. No. 12/846,519, dated Mar. 11, 2015, Ilya D. Rosenberg, "Touch Sensing Techniques", 35 pages.

Office action for U.S. Appl. No. 12/846,497, dated Mar. 15, 2016, Rosenberg et al., "Capacitive Sensing with interpolating Force-Sensitive Resistor Array", 37 pages.

Final Office Action for U.S. Appl. No. 12/846,497, dated Mar. 20, 2015, Ilya D. Rosenberg, "Capacitive Sensing with interpolating Force-Sensitive Resistor Array", 37 pages.

Office action for U.S. Appl. No. 13/247,699, dated Mar. 24, 2016, Beguin et al., "Interacting Through Noncontact Gestures", 25 pages.

Final Office Action for U.S. Appl. No. 12/846,268, dated Apr. 2, 2015, Ilya D. Rosenberg, "Gestures and Touches on Force-sensitive input Devices", 37 pages.

Office action for U.S. Appl. No. 12/846,368, dated Apr. 21, 2016, Rosenberg et al., "Touch Distinction", 24 pages.

Office action for U.S. Appl. No. 15/003,086, dated Apr. 4, 2017. Rosenberg et al., "Gestures and Touches on Force-sensitive Input Devices", 24 pages.

Office action for U.S. Appl. No. 15/003,086, dated Jun. 17, 2016, Rosenberg et al., "Gestures and Touches on Force-sensitive Input Devices", 11 pages.

Office Action for U.S. Appl. No. 12/846,268, dated May 16, 2014, liya D. Rosenberg, "Gestures and Touches on Force-sensitive input Devices", 32 pages.

Office action for U.S. Appl. No. 13/247,699, dated Aug. 27, 2015, Seguin et al., "Interacting Through Noncontact Gestures", 24 pages.

Office action for U.S. Appl. No. 12/846,368, dated Sep. 10, 2015, Rosenberg et al., "Touch Distinction", 20 pages.

Office Action for U.S. Appl. No. 12/846,497, dated Sep. 23, 2016, Rosenberg et al., "Capacitive Sensing with Interpolating Force-Sensitive Resistor Array", 43 pages.

* cited by examiner

FIG. 10 form suitable for processing are used in a variety of applications ranging from digital pictures to geophysical research. The incoming or impinging signal may include mechanical, electromagnetic energy, or other impinging energy. Traditional sensors such as those used for imaging have used arrays of discrete or pixelized sensing elements. For example, a conventional imaging sensor in a digital camera may have millions of discrete imaging elements, each of which generates a pixel in the picture.

HARDWARE ENABLED INTERPOLATING SENSOR AND DISPLAY

PRIORITY

The present application claims priority to U.S. Provisional Application Ser. No. 61/230,592, filed on Jul. 31, 2009, entitled "Inventions Related to Touch Screen Technology." This application is hereby incorporated by reference in its entirety, and the benefit of the filing date of this provisional application is claimed to the fullest extent permitted.

BACKGROUND

A wide variety of devices utilize sensors to detect signals from one or more sources. Sensors which are configured to image a source often use an array of discrete elements sensitive to the signals. For example, an optical imaging sensor may contain a two-dimensional array of imaging elements, also known as pixels. However, sampling from discrete pixels can result in undesirable artifacts such as moiré effects, and require various anti-aliasing techniques. These anti-aliasing techniques introduce complexity, cost, and noise into sensor systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Sensors designed to convert an incoming signal into a form suitable for processing are used in a variety of applications ranging from digital pictures to geophysical research. The incoming or impinging signal may include mechanical, electromagnetic energy, or other impinging energy. Traditional sensors such as those used for imaging have used arrays of discrete or pixelized sensing elements. For example, a conventional imaging sensor in a digital camera may have millions of discrete imaging elements, each of which generates a pixel in the picture.

Pixellated sensors suffer several drawbacks. They are typically expensive to manufacture, in part due to quality control efforts to minimize the number of "dead" or inactive pixels. Furthermore, pixellated sensors are subject to moiré pattern and other effects which result from attempting to sample a signal with a higher frequency than is directly resolvable by the sensor. Additionally, interpolation or the process of "filling in" a gap between pixels and may be used to smooth an image, to simulate a higher resolution image, to simulate a zoom or enlargement of a particular area of an image, and so forth. However, interpolation from conventional pixilated sensors is computationally intensive and may introduce unwanted artifacts which distort the image.

Disclosed here are devices and techniques for a hardware enabled interpolating sensor, as well as an interpolating display. The hardware enabled interpolating sensor (or "HEIS") comprises an addressable array. This addressable array may contain one layer with conductors disposed in rows and another layer with conductors disposed in columns. Each layer of conductors couples to a resistive material. The layers are disposed on opposing sides of a transducer layer, such that the conductors therein form a plurality of addressable junctions. When an impinging signal interacts with the transducer layer, a change may be read out by the addressable array and used to generate an image.

The HEIS may also be used for reconstruction of impinging wavefronts, such as in holographic imaging. The time of arrival of the impinging signal at points within the sensor may be used in conjunction with the location and amplitude information to reconstruct the wavefront.

Additionally, by operating the HEIS in an alternative emissive mode, an interpolating display is possible. An interpolating display is configured similar to the HEIS described above, but when in the emissive mode a signal is applied to the transducing layer such that a signal is emitted from an emissive region. Unlike fixed size emissive pixels in a conventional display, the interpolating display may vary the size and intensity of the emission region.

Hardware Enabled Interpolating Sensor

Figure 1:
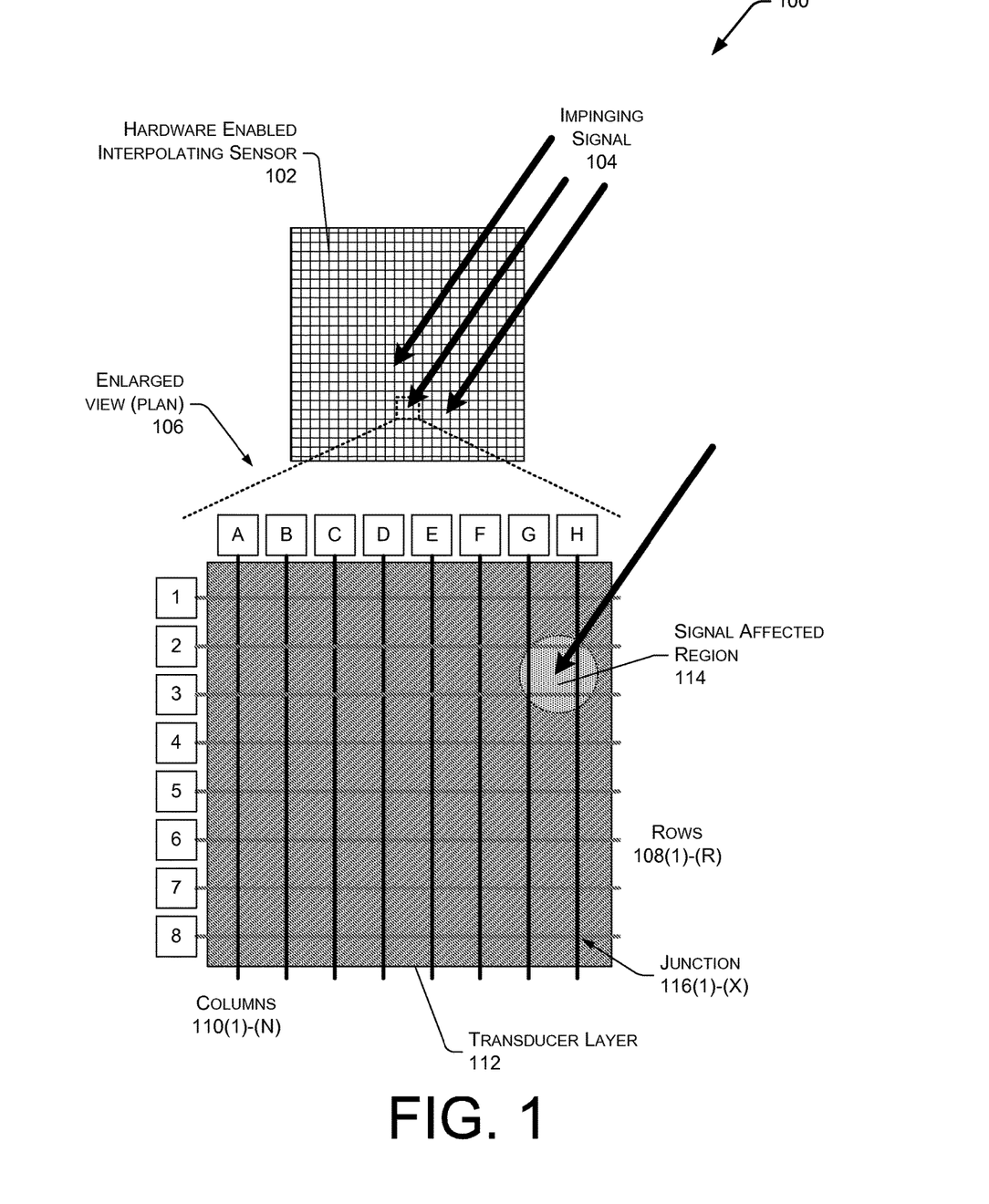
FIG. 1 depicts a hardware enabled interpolating sensor.

FIG. 1 depicts a schematic 100 of a hardware enabled interpolating sensor (HEIS) 102 which is receiving an impinging signal 104. The impinging signal 104 may comprise incident energy such as mechanical or electromagnetic energy. Mechanical energy includes physical displacements such as sounds, while electromagnetic energy includes heat, magnetic fields, light, ionizing radiation, and so forth.

An enlarged plan view 106 of the HEIS 102 is depicted, showing the rows 108(1)-(R) and columns 110(1)-(N) of an addressable array. For ease of illustration and not by way of limitation, eight rows 108 are labeled 1-8 and eight columns 110 are labeled A-H. Also for illustrative purposes, a given junction is designated herein by the row and column, such as "1-A." The rows 108 and columns 110 may comprise transmissive elements such as electrical conductors, electromagnetic waveguides, optical fibers, and so forth. The rows 108 and columns 110 are disposed in a first and a second layer, respectively. Disposed amongst the rows 108 and columns 110 may be drone lines or wires. In this disclosure, drone lines have been omitted for clarity. These drone wires aid in the shaping of a field emanating from the energized transmissive element and also provide a linear drop off in signals from the energized transmissive element.

Between these first and second layers is a transducer layer 112. The transducer layer 112 is configured such that the impinging signal 104 will modify one or more characteristics within a signal affected region 114. The boundary of the signal affected region 114 may vary depending upon how the sensor is driven. In some implementations, the boundary may exhibit a sharp cutoff with non-signal affected regions, while in others the boundary may exhibit a gradual falloff. Some material used in the transducer layer 112 may alter a phase of a readout signal passing through it while electrical conductivity, capacitance, inductance, and so forth may vary in other materials. For example, where the impinging signal 104 is mechanical such as sound, the transducing layer 112 may comprise a piezoelectric material. Where the impinging signal 104 is visible light, a photodiode material may be used. Where the impinging signal 104 is heat, a peltier material may be used.

The impinging signal 104 varies one or more characteristics within the signal affected region 114, such as the electrical resistivity. As described above, the rows 108 and columns 110 intersect to form addressable intersections or junctions 116. The variation in electrical characteristic of the signal affected region 114 is read out at one or more of these junctions 116. Because the rows 108 and columns 110 are disposed within a resistive material, current may flow between neighboring rows 108 and columns 110, which results in non-aliased output.

Because the characteristics of the resistive material are known, and the junctions 116 may be read out individually, interpolation of the impinging signal 104 at locations between the junctions 116 is readily accomplished. For example, the resistive material may have a linear response to resistance such that resistance varies by a known given the thickness of the material. Given an impinging signal at a midpoint between four junctions 116, each of the four junctions 116 will show substantially the same resistance. As a result, a sensor controller may reconstruct that the signal impinged at the midpoint, and well as the amplitude of the signal.

While the addressable array is shown here as a grid having rows 108 and columns 110 which are generally perpendicular to one another, other configurations are possible. In other implementations, other addressable configurations may be used, such as polygonal arrays, polar arrays, and so forth. Additionally, in some implementations, each of the rows 108 and columns 110 may comprise a mesh of transmissive elements rather than a single transmissive element. The HEIS 102 and one implementation of its construction are discussed in more detail below with regards to FIG. 3.

In some implementations, multiple transducer layers 112 may be used to allow for the imaging of different signals, such as different wavelengths. These transducer layers 112 may be disposed between layers containing the transmissive elements, allowing for readout of each respective transducer layer. In some implementations, the layers containing the transmissive elements may be shared with two transducer layers.

Figure 2:
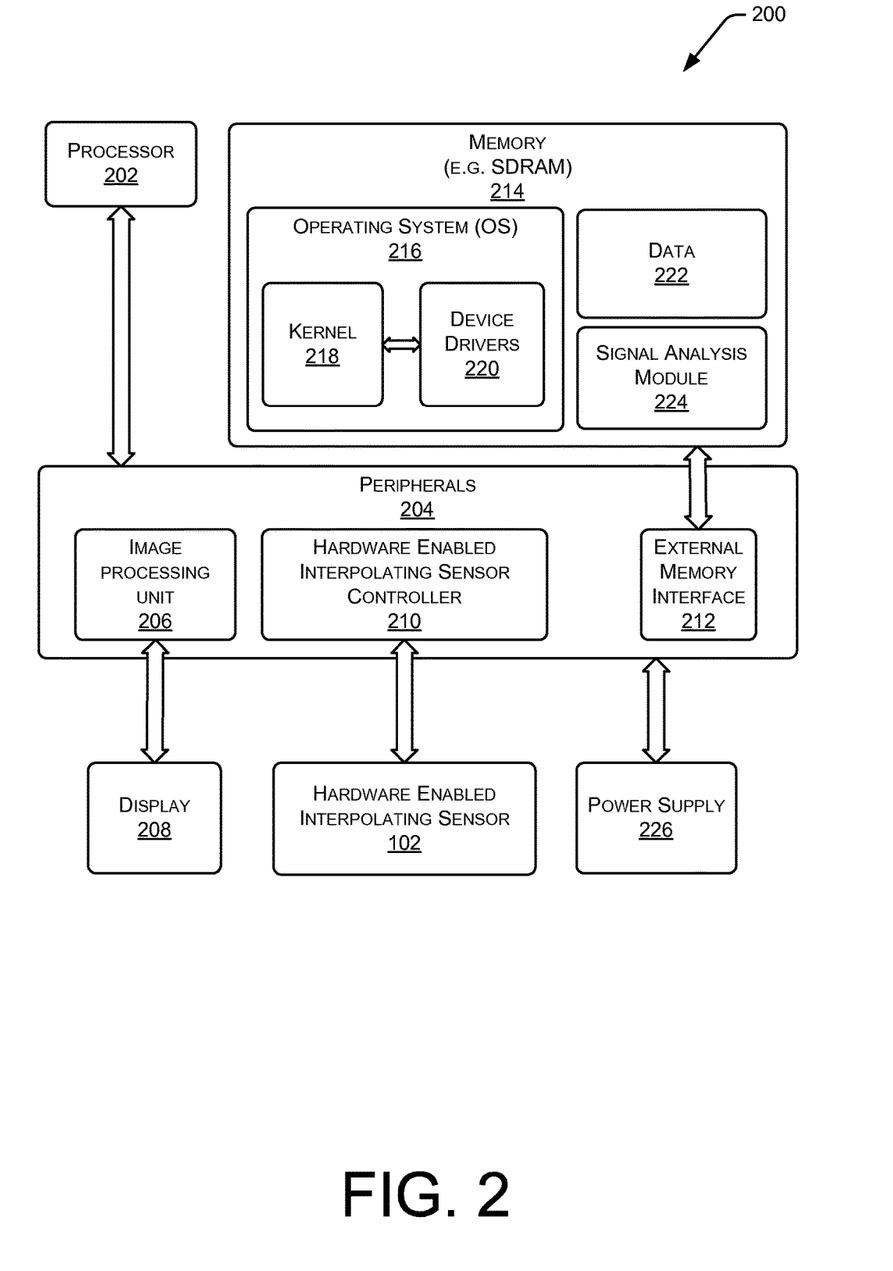
FIG. 2 is an illustrative schematic of an electronic device utilizing the hardware enabled interpolating sensor.

FIG. 2 is an illustrative schematic of an electronic device 200 which may utilize the HEIS 102. In a very basic configuration, the device 200 includes components such as a processor 202 and one or more peripherals 204 coupled to the processor 202. Each processor 202 may itself comprise one or more processors.

An image processing unit 206 is shown coupled to one or more display components 208 (or "displays"). In some implementations, multiple displays may be present and coupled to the image processing unit 206. These multiple displays may be located in the same or different enclosures or panels. Furthermore, one or more image processing units 206 may couple to the multiple displays.

The display 208 may present content in a human-readable format to a user. The display 208 may be reflective, emissive, or a combination of both. Reflective displays utilize incident light and include electrophoretic displays, interferometric modulator displays, cholesteric displays, pre-printed materials, and so forth. Emissive displays do not rely on incident light and, instead, emit light. Emissive displays include backlit liquid crystal displays, time multiplexed optical shutter displays, light emitting diode displays, backlit pre-printed materials, and so forth. When multiple displays are present, these displays may be of the same or different types. For example, one display may be an electrophoretic display while another may be a liquid crystal display. The display 208 may be implemented in any shape, and may have any ratio of height to width. Also, for stylistic or design purposes, the display 208 may be curved or otherwise non-linearly shaped. Furthermore the display 208 may be flexible and configured to fold or roll. In some implementations the display 208 may comprise the interpolated display 800 as described below with regards to FIG. 8.

The content presented on the display 208 may take the form of electronic books or "eBooks." For example, the display 208 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 200 includes a hardware enabled interpolating sensor controller 210, or "sensor controller." The sensor controller 210 couples to the processor 202, such as via a universal serial bus host controller, inter-integrated circuit ("I²C"), universal asynchronous receiver/transmitter ("UART"), serial peripheral interface bus ("SPI"), or other interface. The sensor controller 210 couples to the HEIS 102. In some implementations multiple sensors 102 may be present.

The sensor controller 210 is configured to scan the HEIS 102 and determine effects which correspond to the impinging signal 104. The sensor controller 210 may also interpolate the location and amplitude of impinging signals 104 which fall between junctions 116.

The device 200 may also include an external memory interface ("EMI") 212 coupled to external memory 214. The EMI 212 manages access to data stored in external memory 214. The external memory 214 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 214 may store an operating system 216 comprising a kernel 218 operatively coupled to one or more device drivers 220. The device drivers 220 are also operatively coupled to peripherals 204, such as the sensor controller 210. The external memory 214 may also store data 222, which may comprise content objects for consumption on the device 200, executable programs, databases, user settings, configuration files, device status, and so forth. A signal analysis module 224 may also be stored in memory 214. The signal analysis module 224 may be configured to analyze data generated by the sensor controller 210 to characterize and image the impinging signal 104.

A power supply 226 provides operational electrical power to components of the device 200 for operation when the device. The device 200 may also include one or more other, non-illustrated peripherals, such as input controls, a hard drive using magnetic, optical, or solid state storage to store information, a firewire bus, a Bluetooth™ wireless network interface, camera, global positioning system, PC Card component, and so forth.

Couplings, such as that between the kernel 218 and the device drivers 220 are shown for emphasis. There are couplings between many of the components illustrated in FIG. 2, but graphical arrows are omitted for clarity of illustration.

Figure 3:
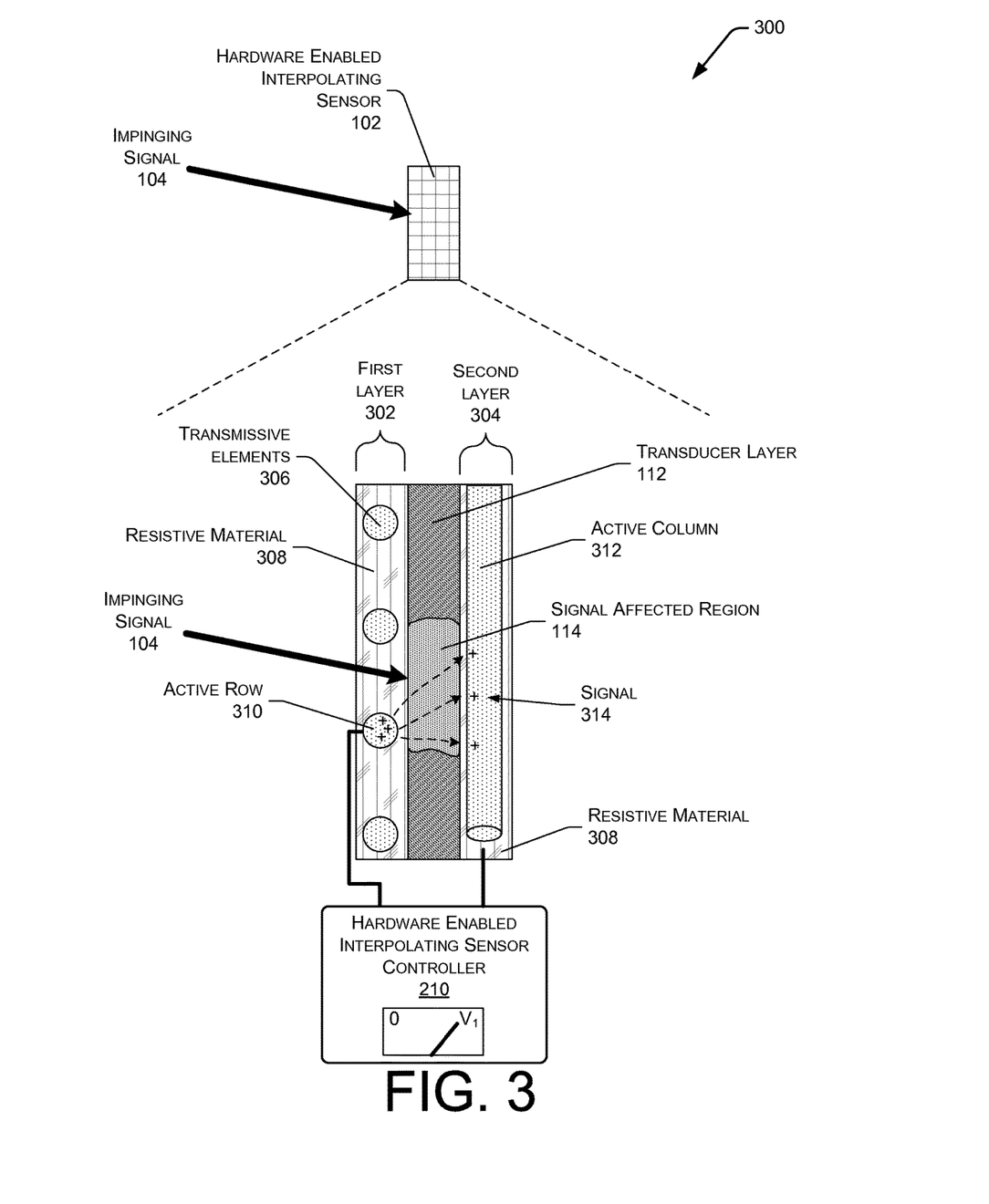
FIG. 3 illustrates a cross section of the hardware enabled interpolating sensor.

FIG. 3 illustrates a cross section 300 of the hardware enabled interpolating sensor. In this illustration, the transducer layer 112 is disposed between a first layer 302 and a second layer 304. The transmissive elements within the first layer 302 and the second layer 304 are coupled to the hardware enabled interpolating sensor controller 210.

The transmissive elements 306 are configured to couple to one another. For example, where the transmissive elements 306 are electrical conductors, this coupling may comprise a connection of the transmissive elements 306 with a resistive material 308. In the implementation depicted here, the first layer 302 comprises transmissive elements 306 embedded within the resistive material 308. Drone wires (omitted here for clarity) may also be present which are generally parallel to the transmissive elements 306. In other implementations the transmissive elements 306 may be disposed adjacent to and in contact with the resistive material 308. In yet another implementation, the resistive material 308 may be disposed around the edges of the array, thus interconnecting transmissive elements 306 without obscuring the transducer layer 112.

The resistive material 308 is configured such that charge (or electromagnetic signals such as light) may flow between neighboring rows and columns, which results in non-aliased output. Because the characteristics of the resistive material 308 are known, and the junctions may be read out individually by the sensor controller 210, interpolation of the incoming signal at locations between the junctions is readily accomplished.

An active row 310 coupled to the sensor controller 210 is shown with a charge applied, such as may be used to scan the junction formed by the transmissive elements 306 of the first layer 302 and the second layer 304.

Within the transducer layer 112, the signal affected region 114 is depicted. The signal affected region 114 is a region within the transducer layer 112 material which has one or more characteristics which are altered as a result of the impinging signal 104. For example, in one implementation, the impinging signal 104 may alter the resistivity of that region. As a result, the sensor controller 210 may scan and detect that this region has received a signal based on the change in resistivity, and characterize the impinging signal 104.

Adjacent to and coupled with the transducer layer 304 is the second layer 304. The second layer 304 comprises an active column 312 and transmissive elements 306 (hidden in this view). In this implementation, the read out signal in the form of the charge on the active row 310 has propagated across the signal affected region 114 and is read out by the sensor controller 210 as a signal 314 at the active column 312.

As a result, at the junction 116 described by the active row 310 and the active column 312, the state of the transducer layer 112 may be characterized. This characterization results in a signal which corresponds, at least in part, to the impinging signal 104. The sensor controller 210 may scan the junctions 116(1)-(X) and generate a representation of an image corresponding to the impinging signal 104.

Figure 4:
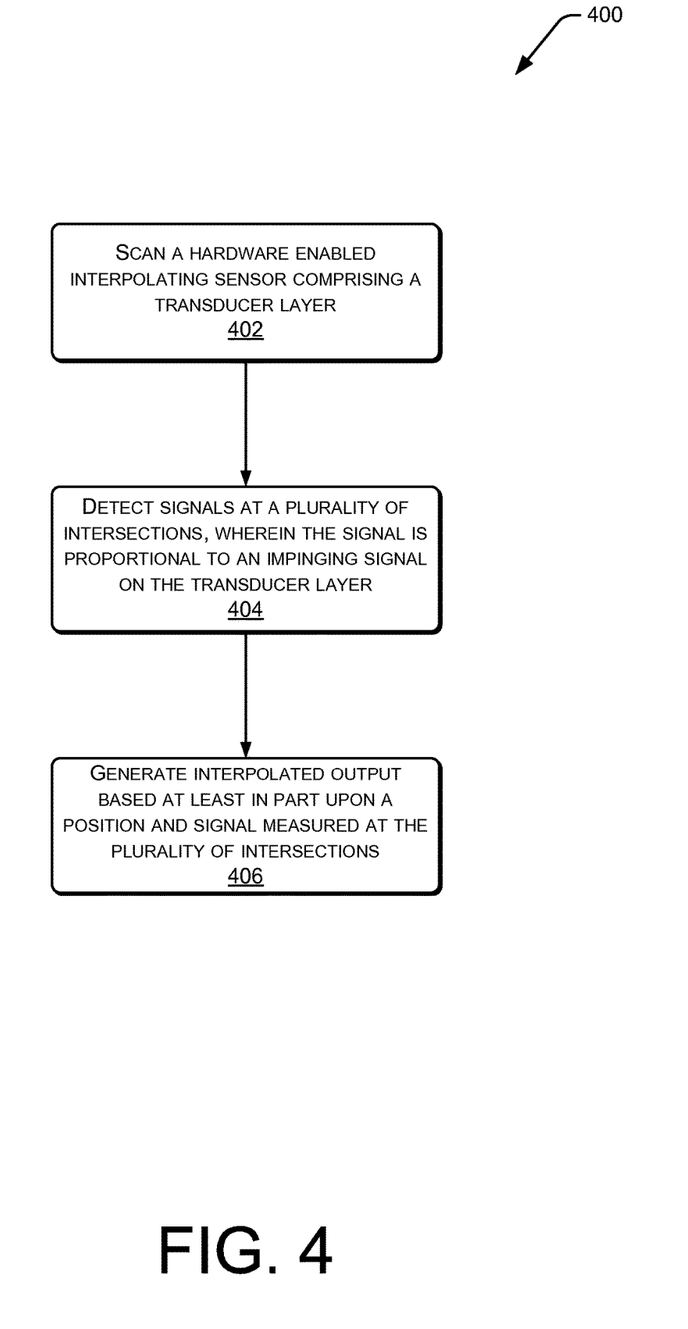
FIG. 4 is an illustrative process of generating interpolated output from the hardware enabled interpolating sensor.

FIG. 4 is an illustrative process 400 of generating interpolated output from the hardware enabled interpolating sensor. This process, and others described in this disclosure may, be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 402, the sensor controller 210 scans the hardware enabled interpolating sensor (HEIS) 102 which comprises a transducer layer 112. As described above, the transducer layer 112 is configured to change in response to an impinging signal 104. The change may then be read out as a signal discernable by the sensor controller 210.

At 404, the sensor controller 210 detects signals at a plurality of intersections, wherein the signal is proportional to the incident signal 104 on the transducer layer 112 proximate to the plurality of intersections. Signals may include voltage, current, transmissivity, inductance, capacitance, phase, and so forth individually or in combination.

At 406, the sensor controller 210 generates interpolated output based at least in part upon a position and signal measured at the plurality of intersections. This interpolated output considers the characteristics of the resistive material 308 which the transmissive elements 306 are coupled to. Because of the known characteristics, such as resistance per distance, signals from multiple junctions 116 may be combined to generate interpolated data points. In effect, the sensor 102 is able to resolve input which occurs in between junctions 116, freeing the sensor 102 from pixellation constraints and aliasing issues.

Figure 5:
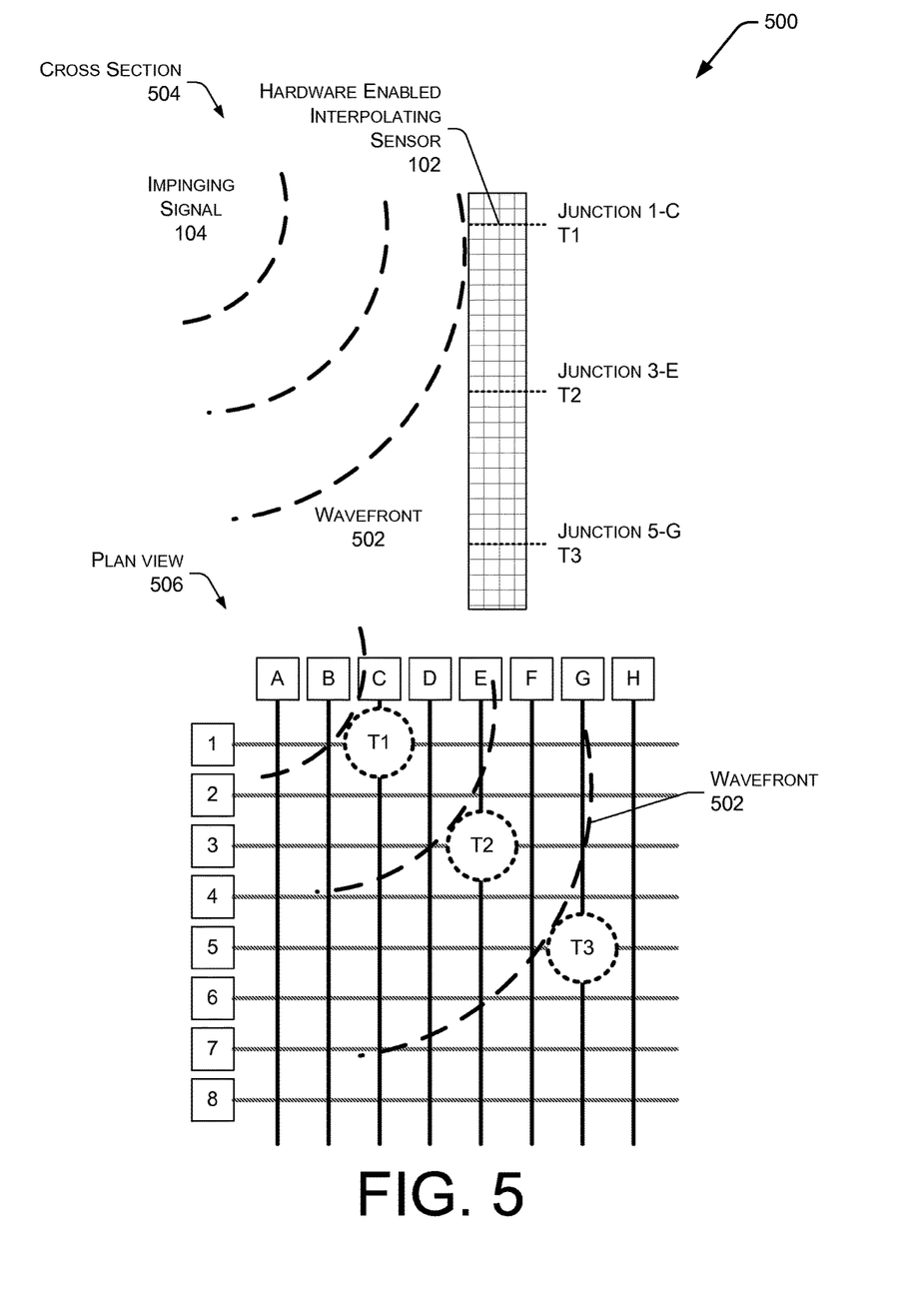
FIG. 5 illustrates a spatial and temporal analysis of an impinging signal wavefront at the hardware enabled interpolating sensor.

FIG. 5 illustrates a spatial and temporal analysis 500 of an impinging signal wavefront at the hardware enabled interpolating sensor. As shown here, the impinging signal 104 is depicted as a wave with a generally arcuate wavefront. For example, this may be used to describe an acoustic or electromagnetic signal resulting from a point source. A wavefront 502 of the wave from the impinging signal 104 is shown coming into contact with the sensor 102 in a cross sectional view 504, and a plan view 506.

As shown in the cross sectional view 504, the wavefront 502 impinges upon the sensor 102 at time T1 at junction 1-C. As the wavefront 502 moves, it contacts with the sensor 102 at time T2 at junction 3-E. Finally, the wavefront 502 is shown contacting at time T3 junction 5-G. As shown in the plan view 506, the wavefront 502 moves generally diagonally across the sensor 102.

By monitoring the position of the signal within the array and a time of arrival, the sensor controller 210 may determine a direction of origin of the impinging signal 104, reconstruct the wavefront 502 to generate a holographic image, and so forth. Where the impinging signal 104 has a duration of less than the scan rate of the sensor 102, timing information about the impinging signal 104 may be derived based upon known persistence effects within the transducing material. For example, consider where the transducer layer 112 comprises a phosphorescent material and the impinging signal 104 comprises a photon having a requisite energy to generate phosphorescence. The impinging signal 104 will trigger the phosphoerescence, which will persist for a particular amount of time and decay at a known rate. In combination with other factors known about the sensor 102 and which may be derived about the impinging signal 104, the time of arrival may be determined.

Figure 6:
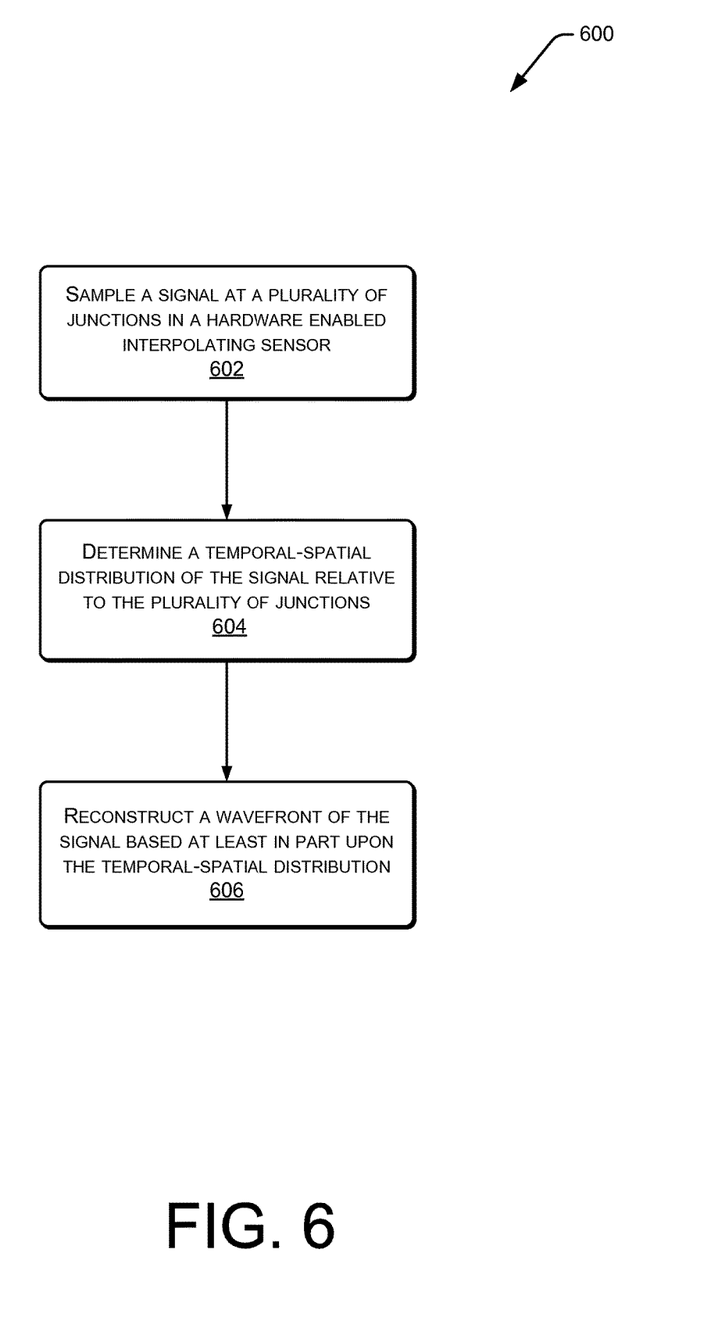
FIG. 6 is an illustrative process of reconstructing a wavefront of a signal received by the hardware enabled interpolating sensor.

FIG. 6 is an illustrative process 600 of reconstructing a wavefront of a signal received by the hardware enabled interpolating sensor. At 602, the sensor controller 210 samples signals at a plurality of junctions within a HEIS 102. This sampling may occur with sequence sampling, randomized sampling, simultaneous sampling, and so forth.

At 604, the sensor controller 210 determines a temporal-spatial distribution of the impinging signal 104 relative to the plurality the junctions. For example, as described above with regards to FIG. 5, the sensor controller may determine that the impinging signal 104 was received at locations 1-C, 3-E, and 5G at times T1, T2, and T3 respectively.

At 606, the sensor controller 210 reconstructs a wavefront of the signal based at least in part upon the temporal-spatial distribution. This reconstruction may be used to determine direction, intensity, and other aspects of a source of the impinging signal 104. In some implementations, this wavefront reconstruction may be used to generate a holographic image of the signal source. In some implementations, the signal analysis module 224 may perform all or a portion of this reconstruction.

Figure 7:
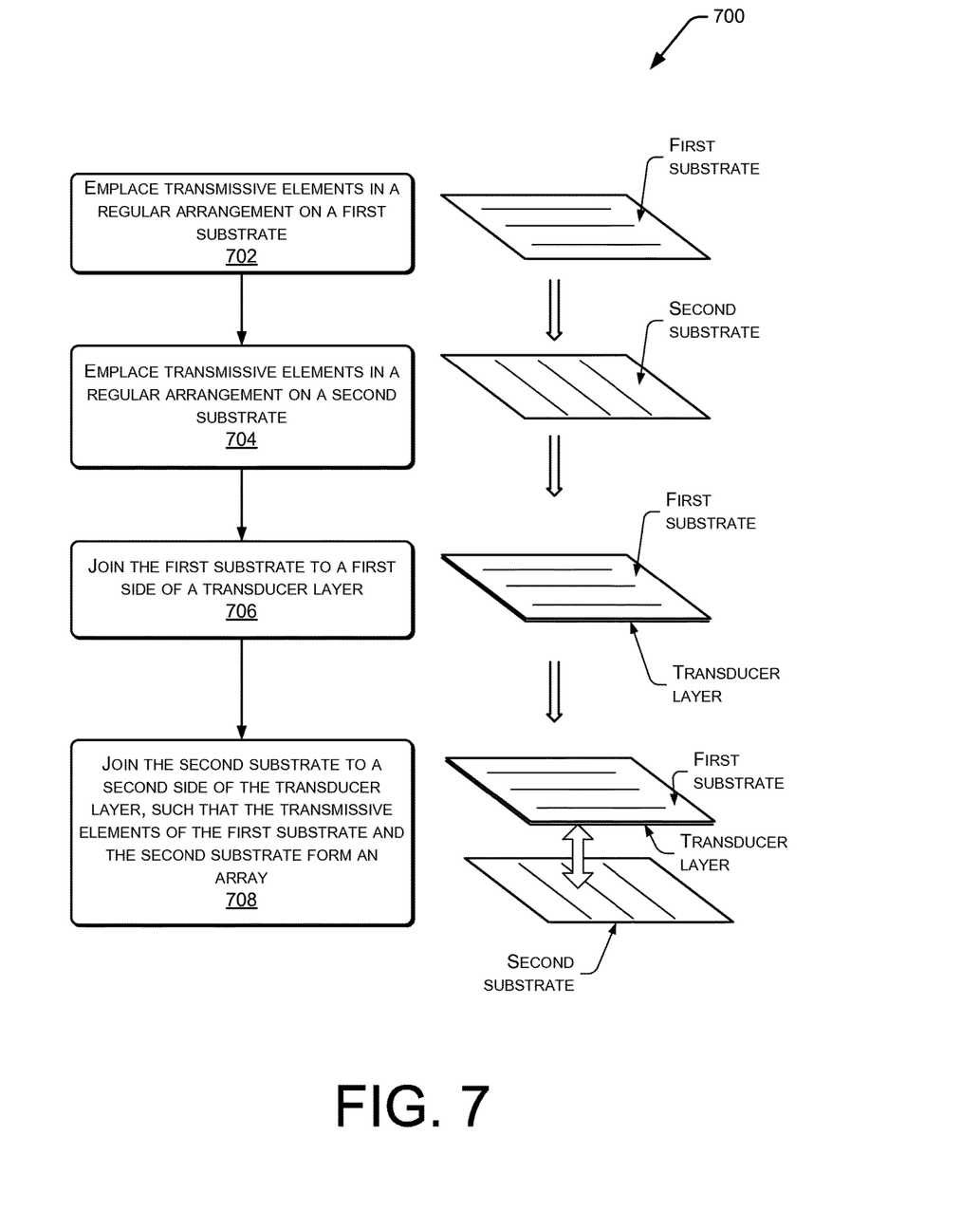
FIG. 7 is an illustrative process of constructing a hardware enabled interpolating sensor.

FIG. 7 is an illustrative process 700 of constructing a hardware enabled interpolating sensor. At 702, transmissive elements are emplaced in a regular arrangement on a first substrate and configured such that a coupling exists between them. For example, a linearly resistive material in the case of electrical conductors. In some implementations, the substrate may comprise the resistive material 308. These transmissive elements may comprise electrical conductors, optical fibers, electromagnetic waveguides, and so forth. This emplacement may include deposition, printing, implantation, lamination, and so forth.

At 704, transmissive elements are emplaced in a regular arrangement on a second substrate and configured such that a coupling exists between them. The arrangement of the conductive elements on the first and second substrates is configured such that, when assembled, an addressable array is formed. In one arrangement, the conductive elements in the two layers are oriented perpendicularly to form a grid pattern.

At 706, the first substrate is joined to a first side of a transducer layer 112. Joining may include adhesion, lamination, contact, and so forth. At 708, the second substrate is joined to a second side of the transducer layer such that the conductive elements of the first substrate and the second substrate form an array. Once joined, the completed HEIS 102 may be coupled to the sensor controller 210.

As described herein, the fabrication process for a sensor is relatively inexpensive because conductive elements may be literally printed onto the substrate. Furthermore, because of the interpolating nature of the sensor, the assembly may tolerate a higher level of defects. As a result, quality controls may be relaxed, reducing costs due to wastage, additional testing, and so forth.

Interpolating Display

Figure 8:
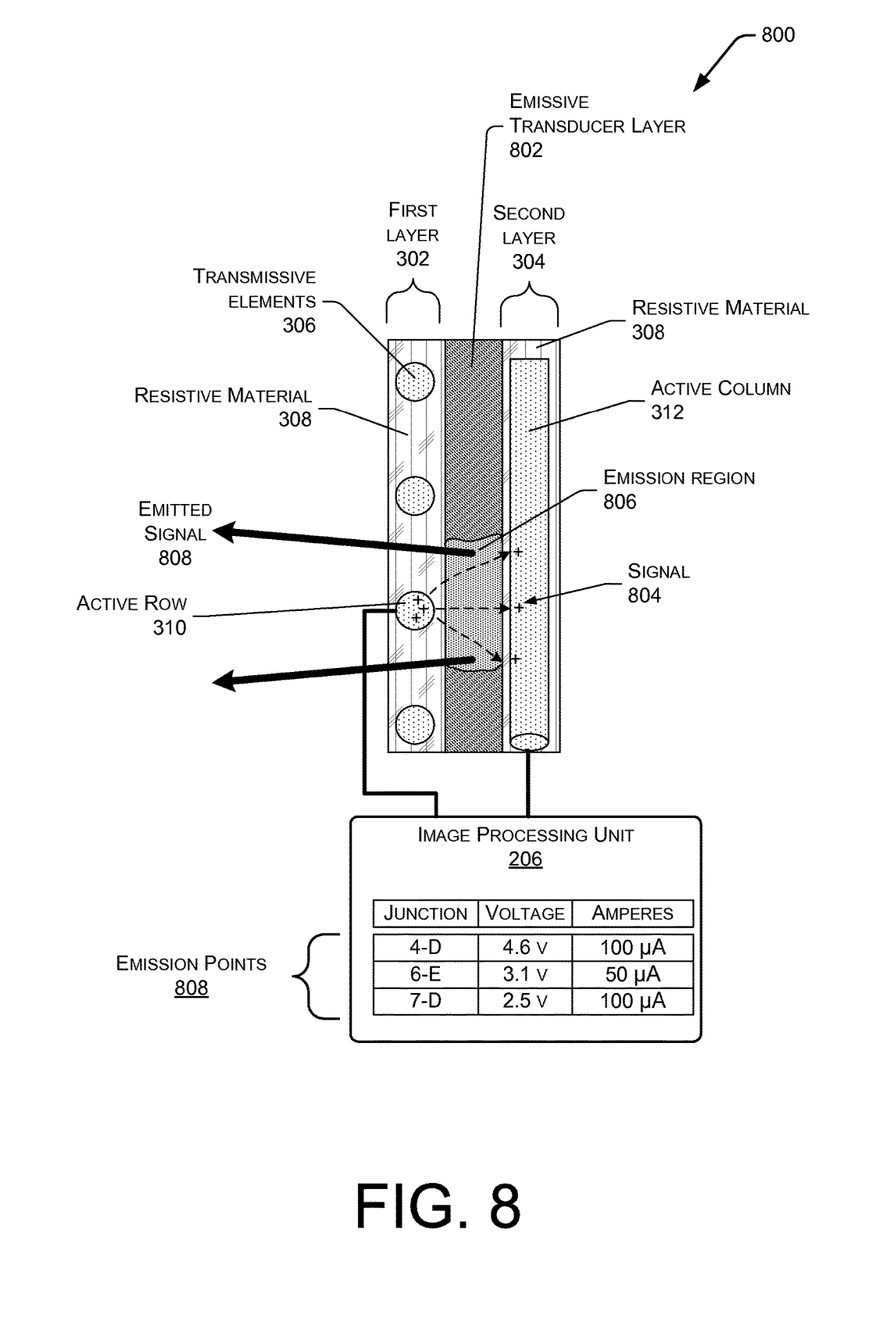
FIG. 8 illustrates a cross section of an interpolating display.

FIG. 8 illustrates a cross section of an interpolating display 800, which modifies the HEIS 102 of FIG. 3 to emit a signal rather than detect one. This emitted signal may be mechanical or electromagnetic, depending upon the characteristics of the transducer layer 112. In some implementations, both functions of signal detection and signal generation may be combined, such that impinging signals 104 may be received (FIG. 3) and emitted signals may be generated (FIG. 8). For example, the interpolating display 800 may incorporate a transducer layer 112 which emits light and which is force sensitive, providing a combined touch sensitive display.

Similar to FIG. 3 above, the first layer 302 and the second layer 304 contain transmissive elements 306 which are coupled to the resistive material 308. However, in this implementation, an emissive transducer layer 802 is configured to emit a signal when power is applied. For example, the emissive transducer layer 802 may comprise a p-n junction material configured to emit photons such as in a light emitting diode, an electroluminescent material, and so forth. In another example, the emissive transducer layer 802 may comprise a piezoelectric material suitable for generating a physical displacement such as sound.

As shown here, the active row 310 provides a signal 804 which traverses the emissive transducer layer 802 to an active column 312. This signal traversal results in formation of an emission region 806, which in turn generates an emitted signal 808. For example, the emitted signal 808 may comprise a photon or a pressure wave. In some implementations, the emission region 806 may not manifest a sharp boundary with adjacent non-emission regions. For example, in some instances a gradual falloff may be present.

The material within the emissive transducer layer 802 may be configured to vary size of emission region and intensity or flux of emitted signal 808 in response to variations in voltage, current, and so forth. Thus, each emission region may be more final controlled than a conventional display pixel.

In this illustration, the image processing unit 206 is configured to drive the interpolating display 800. For illustrative purposes, the image processing unit 206 is shown generating three emission points 808 with the following parameters:

TABLE 1

| Junction | Voltage | Amperes | Region Size/Illuminated Area | Intensity |
|---|---|---|---|---|
| 4-D | 4.6 v | 100 µA | Large | High |
| 6-E | 3.1 v | 50 µA | Medium | Medium |
| 7-D | 2.5 v | 100 µA | Small | High |

Figure 9:
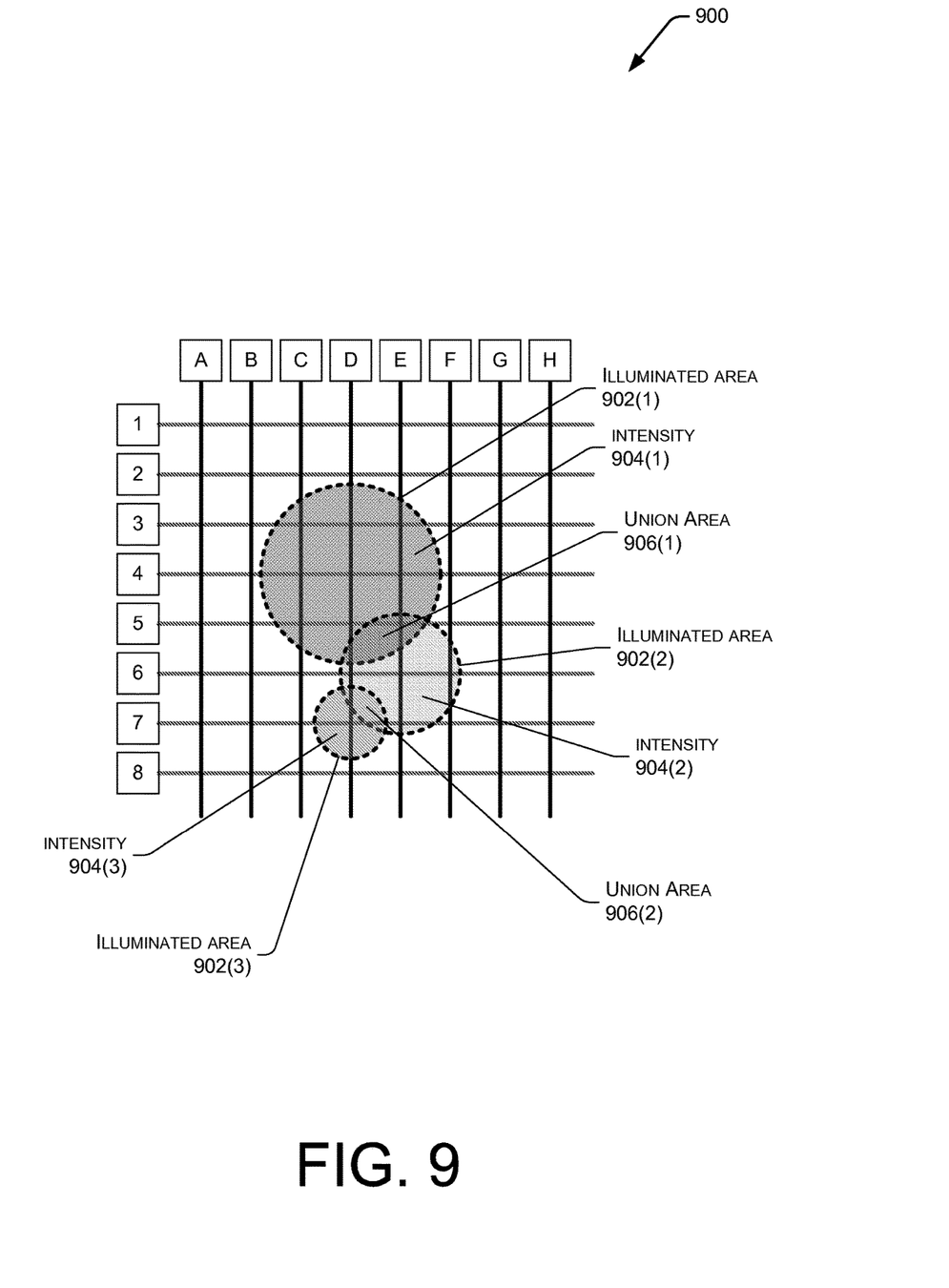
FIG. 9 illustrates output at several junctions on the interpolating display.

FIG. 9 illustrates output 900 at several junctions on the interpolating display of FIG. 8. Unlike fixed size emissive pixels in a conventional display, the interpolating display 800 may vary the size and intensity of the emission region. A larger emissive region corresponds to a larger illuminated area. For example, a higher voltage applied to a junction may result in a large emissive region as the signal disperses across the resistive layer and through the transducing layer, while a higher applied current may increase intensity. By varying characteristics such as voltage and current, the image processing unit 206 may vary the size of the region affected within the transducing material which affects the illuminated area, intensity of the signal produced, and so forth.

Continuing the example of FIG. 8, three emission points are present. The first emission point centered at junction 4-D has a relatively large illuminated area 902(1) due to the relatively high voltage and has a corresponding relatively high intensity 904(1) resulting from the relatively high amperage. The second emission point centered at junction 6-E shows an illuminated area 902(2) due a lower voltage and an intensity 904(2) less than that of the first emission point at 4-D due to lower amperage. The third emission point centered at 7-D has the smallest illuminated area 902(3) due to its lowest voltage and the highest intensity 904(3) due to the high amperage.

Because the effects of the emissive transducer layer 802 are not confined to particular pixels, it is possible to also generate images or portions of an image utilizing union areas. A union area 906 occurs where two or more junctions 116 drive a particular region of the emissive transducer layer 802. This driving may occur sequentially or contemporaneously. This union area 906 may result in variations to the intensity, boundaries of the emissive region, and so forth. As shown in this illustration, a union area 906(1) results from an overlap between the emission centered at points 4-D and 6-E. The union area 906(1) may experience a greater intensity due to the combined effects of both active junctions.

Likewise a second union area 906(2) results from overlap of the emission regions 806 from junctions 6-E and 7-D. In some implementations, portions of the images may be formed by one or more union areas 906. In some implementations the union areas 906 may result in a signal emission, while the emission regions 806 at an individual junction 116 may have insufficient power to emit a signal. For example, the current may be reduced to provide a minimal or no intensity 904, except in the union area 906. Thus, an image may be formed not from discrete emission regions, but rather from emitting union areas 906.

While the emission regions 806 and corresponding illuminated areas 902 are depicted as generally circular, it is understood that other geometries may result as a result of interactions between transmissive elements, anisotropy in the emissive transducing layer 802, and so forth. For example, adjacent transmissive elements may be placed into a high impedance mode, have a differential voltage applied, be partially grounded, or otherwise modified to shape the emissive region. Thus in some implementations the emission regions 806 may appear as generally rectangular, elliptical, triangular, and so forth when seen in plan view. Furthermore, sensing regions within in the HEIS 102 may also be shaped in similar fashion.

Figure 10:
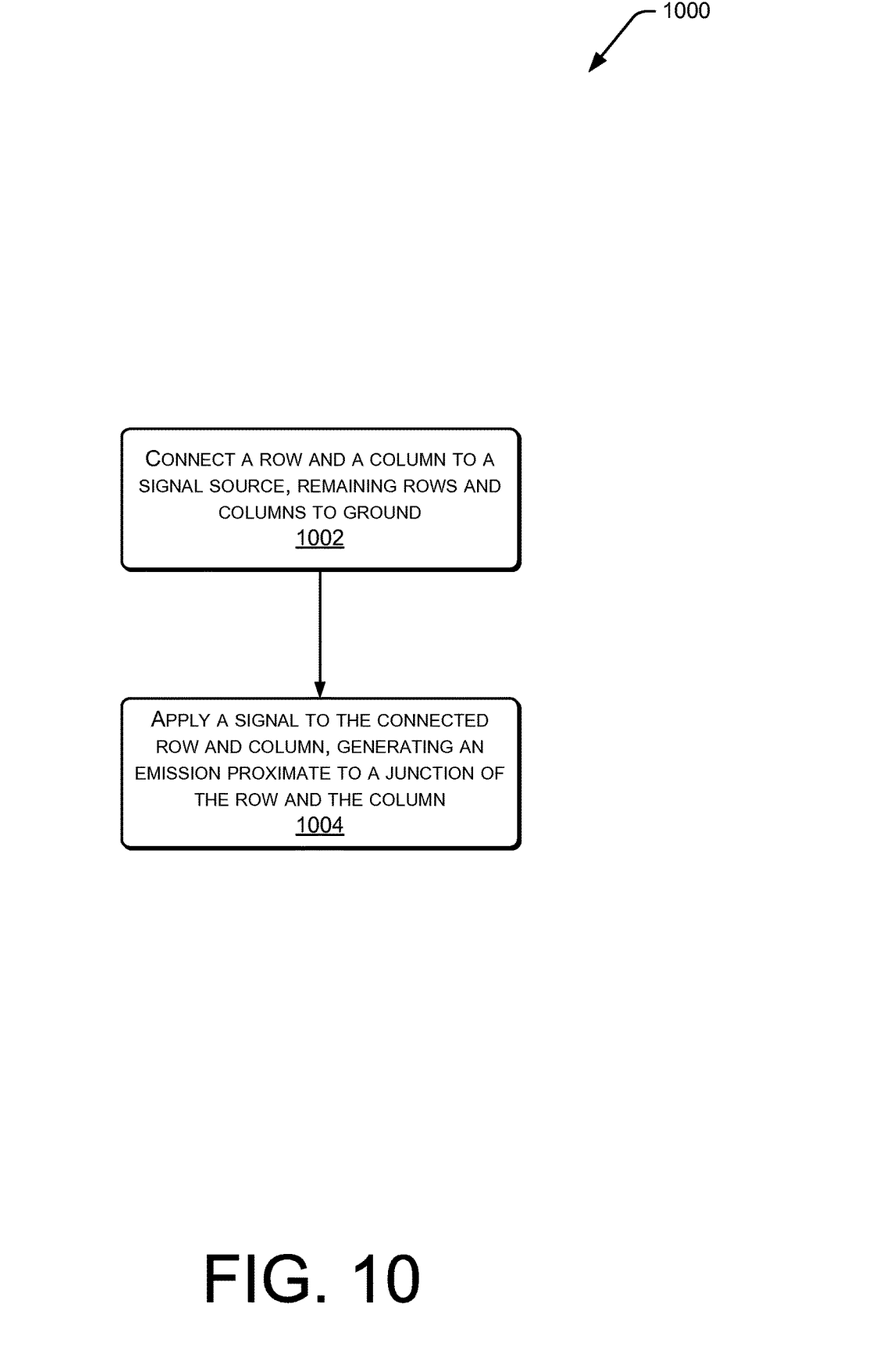
FIG. 10 is an illustrative process of generating an emission on the interpolating display.

FIG. 10 is an illustrative process 1000 of generating an emission on the interpolating display 800. At 1002, a row and a column are connected to a signal source, while remaining rows and columns are connected to ground. Adjacent rows and adjacent columns within a layer remain coupled to one another to some extent by the resistive material 308.

At 1004, a signal is applied to the connected row and column, generating an emission within the emissive transducer layer 802 proximate to a junction of the row and the column. For example, the emission points 808 as described above. A plurality of emission points 808 may be combined to generate an image.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
    a first layer comprising a first plurality of electrically conductive elements arranged in a first pattern contained within an electrically resistive material;
    a transducer layer coupled to the first layer to generate a signal based on a change in electrical resistivity in response to an impinging signal comprising electromagnetic radiation; and
    a second layer coupled to the transducer layer and comprising a second plurality of electrically conductive elements arranged in a second pattern contained within an electrically resistive material, wherein the second layer is disposed relative to the first layer such that the first plurality of electrically conductive elements are generally perpendicular to the second plurality of electrically conductive elements.

2. The device of claim 1, wherein the electrically resistive material is anisotropic.

3. The device of claim 1, wherein the transducer layer comprises a photodiode material.

4. The device of claim 1, further comprising a controller configured to scan one or more intersections formed by the first plurality of electrically conductive elements and the second plurality of electrically conductive elements to determine a variation in the electrical resistivity in the transducer layer proximate to a junction.

5. The device of claim 1, wherein an amplitude of the signal based on the change in electrical resistivity is proportional to an amplitude of the electromagnetic radiation.

6. A device comprising:
    a first layer comprising a first plurality of optical waveguides and coupled to one another within a resistive material;
    a transducer layer coupled to the first layer to generate a signal in response to a change in electrical resistivity based at least in part on an impinging signal at the first layer, wherein the generated signal is proportional to the impinging signal; and
    a second layer coupled to the transducer layer and comprising a second plurality of optical waveguides and coupled to one another within a resistive material, wherein the second layer is disposed relative to the first layer such that the first plurality of optical waveguides and the second plurality of optical waveguides form an addressable array.

7. The device of claim 6, wherein the first plurality of optical waveguides are arranged in a regular pattern and second plurality of optical waveguides are arranged in a regular pattern layer.

8. The device of claim 7, further comprising a controller configured to scan the addressable array to determine a variation in the transducer layer proximate to a junction within the addressable array.

9. A device comprising:
    a first layer comprising a first plurality of optical waveguides arranged in a regular pattern contained within an electrically resistive material;

a second layer comprising a second plurality of optical waveguides arranged in a regular pattern contained within an electrically resistive material, wherein the second layer is disposed relative to the first layer such that the first plurality of optical waveguides are generally perpendicular to the second plurality of optical waveguides; and a transducer layer coupled to and disposed between the first layer and the second layer to emit a signal in response to an applied voltage, wherein an amplitude of the emitted signal is proportional to an amplitude of the applied voltage.

10. The device of claim 9, wherein the emitted signal comprises electromagnetic radiation.

11. The device of claim 9, wherein the transducer layer comprises a piezoelectric material and the emitted signal comprises sound.

12. The device of claim 9, wherein the electrically resistive material is anisotropic.

13. The device of claim 9, further comprising a controller configured to:

connect one or more of the first plurality of optical waveguides and one or more of the second plurality of optical waveguides to a signal source configured to generate the applied voltage;

connect remaining optical waveguides of the first plurality of optical waveguides and the remaining optical waveguides of the second plurality of optical waveguides to ground; and provide the applied voltage to the remaining optical waveguides of the first plurality of optical waveguides and remaining optical waveguides of the second plurality of optical waveguides.

* * * * *